Oct. 27, 1970     A. G. VEITH ET AL     3,535,914
CONTINUOUS SHEAR DYNAMOMETER
Filed Feb. 7, 1969     5 Sheets-Sheet 1

INVENTORS
ALAN G. VEITH
ALFONSO W. MEHRBRODT
BY Joseph Januszkiewicz
ATTY.

INVENTORS
ALAN G. VEITH
ALFONSO W. MEHRBRODT
BY Joseph Januszkiewicz
ATTY.

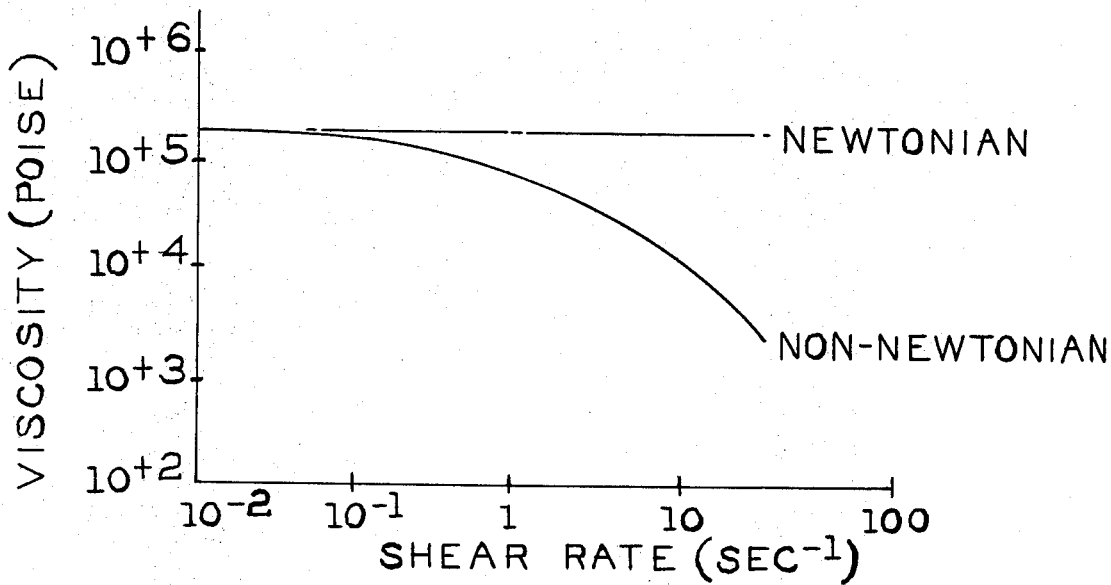
Fig. 7
Fig. 8
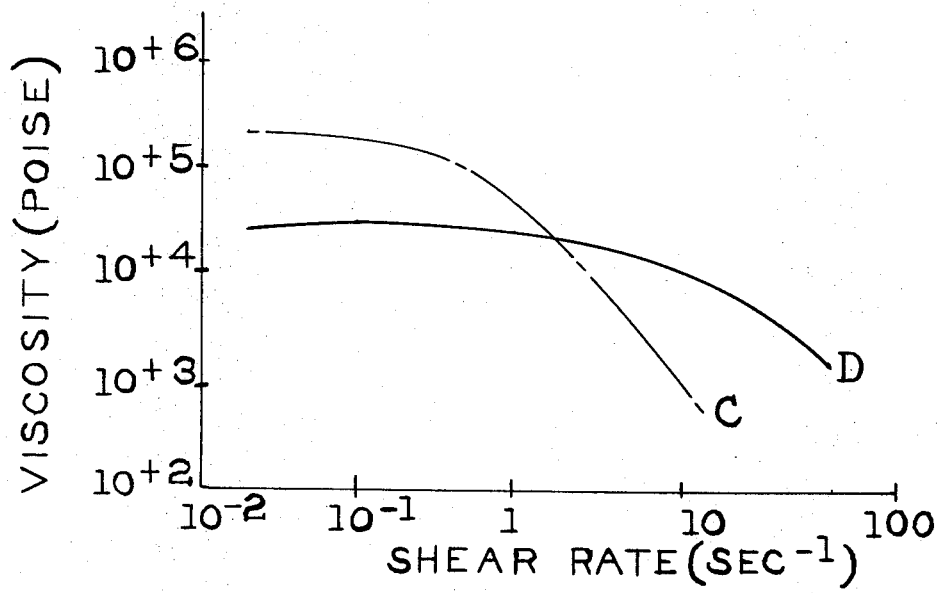

United States Patent Office 3,535,914
Patented Oct. 27, 1970

3,535,914
CONTINUOUS SHEAR DYNAMOMETER
Alan G. Veith, Copley, and Alfonso W. Mehrbrodt, Brecksville, Ohio, assignors to The B. F. Goodrich Company, New York, N.Y., a corporation of New York
Filed Feb. 7, 1969, Ser. No. 797,413
Int. Cl. G01n 11/14
U.S. Cl. 73—15.6                14 Claims

ABSTRACT OF THE DISCLOSURE

The flow or rheological properties of rubber is obtained by continuously rotating a conical shaped projection relative to a flat cylindrical shaped plate. The outer periphery of the flat plate is bonded to an inner periphery of a first carrier that carries the flat plate. The flat plate and first carrier form coplanar surfaces and an annular groove is formed around the plate in the flat surface of the carrier. The projection has an annular shaped ring encompassing the outer periphery thereof and is mounted on a second carrier. The two carriers are movable relative to each other, such that the registration of the annular ring with the annular groove forms a test chamber for the rubber being tested. The torsional resistance from the flat plate of the material being tested as the conical projection is being rotated provided a comparison of the variations in stresses during flow or shear.

BACKGROUND OF THE INVENTION

This invention relates to a test instrument and more particularly to a device that imposes continuous shear condition to a test sample utilizing a cone and plate member that measures viscous and elastic forces.

In the preparation and evaluation of new elastomeric materials and new rubber polymers as well as in research compounding and in development compounding it is necessary to obtain accurate information on processing behavior. A test instrument is needed which will accurately measure both viscous and elastic stresses when the rubber or test material is subjected to the shearing and temperature environment of factory processing so that sufficient and accurate data may be obtained and used for research as well as factory control. By processing is meant the mixing of rubber or synthetics with pigments thence forming and shaping the mixed rubber as by milling, tubing or calendering. In addition it is necessary that such test apparatus be rugged, easily operated and have a high data output as where such test apparatus is capable of producing data in a short test of about two to four minutes. No commercial device exists that will satisfy all of these requirements. Heretofore an instrument used to obtain comparable data is the Mooney viscometer as disclosed by U.S. Pat. 2,037,529 wherein stator means, a pair of spaced covers cooperate with a rotor to define a chamber of fixed volume for test material between them and wherein the material is subjected to a continuous slow speed shearing action to measure its viscosity. The viscosity measured is the average coefficient of viscosity which is a constant times the total shearing force divided by the average rate of shear. Such measurement is effected by measuring the torque applied to the rotor which is taken as proportional to the shearing force and by measuring the angular velocity of rotation under such applied torque which latter measurement is taken as proportional to the rate of shear. The rotation is at a fixed constant speed. As stated in such Mooney patent, the final reading, within one minute as a rule, becomes constant and is the measure of the relative viscosity of the test sample. The speed of rotation of the rotor relative to the stator is relatively slow at approximately 2 r.p.m. A limitation of such devices is that they are not adaptable for use on materials that exhibit a non-Newtonian flow behavior or rheology as in high polymer materials such as the several polybutadienes, new emulsion polybutadiene and polyisoprene and all commercial rubbers. Non-Newtonian flow behavior may be defined as the non-constancy of the viscosity as shear rate is increased. This is illustrated in FIGS. 7 and 8. Shear rate as used herein is defined as the differential velocity of two parallel surfaces divided by their separation. Where material is confined between two surfaces and adheres to each, and there is relative movement between them, then the material will be sheared wherein the shear rate will have the units of seconds$^{-1}$ when the velocity has units of centimeters per second and the separation has units of centimeters. All polymers do not have the same shear rate vs. shear stress behavior and further in comparing polymers it is important to determine their viscosity at different shear rates. As an example note FIG. 8 wherein compound C at a low shear rate is more viscous than D, but at high shear rates D is more viscous than C. Thus, if a low shear rate viscometer were used to measure the viscosity it could not accurately predict high shear rate behavior.

SUMMARY OF THE INVENTION

The present invention provides a single test instrument which accurately measures viscous and elastic stresses of elastomeric materials, that are subjected to shearing and temperature conditions that exist in factory processing. In the device a cylindrically shaped volume as modified by a cone-shaped rotor receives a test sample including liquids and materials of low viscosity. Such rotor is driven at selective speeds which provides uniform shear rates over such range of speeds to accurately obtain viscosity at different shear rates. Such instrument also measures the normal stress at different shear rates. This invention compensates for the expansion of the test sample, provides means for elimination of the heat generated in shear, provides a uniform shear rate throughout the material in the test chamber thereby considerably simplifying the output data, the meaningfulness thereof and increasing the accuracy thereof.

BRIEF DESCRIPTION OF THE DRAWINGS

FIG. 7 is a chart disclosing the shear rate and viscosity relationship of Newtonian and non-Newtonian materials.

FIG. 8 is a chart disclosing the shear rate and viscosity relationship of two different compounds.

DETAILED DESCRIPTION

Figure 1:
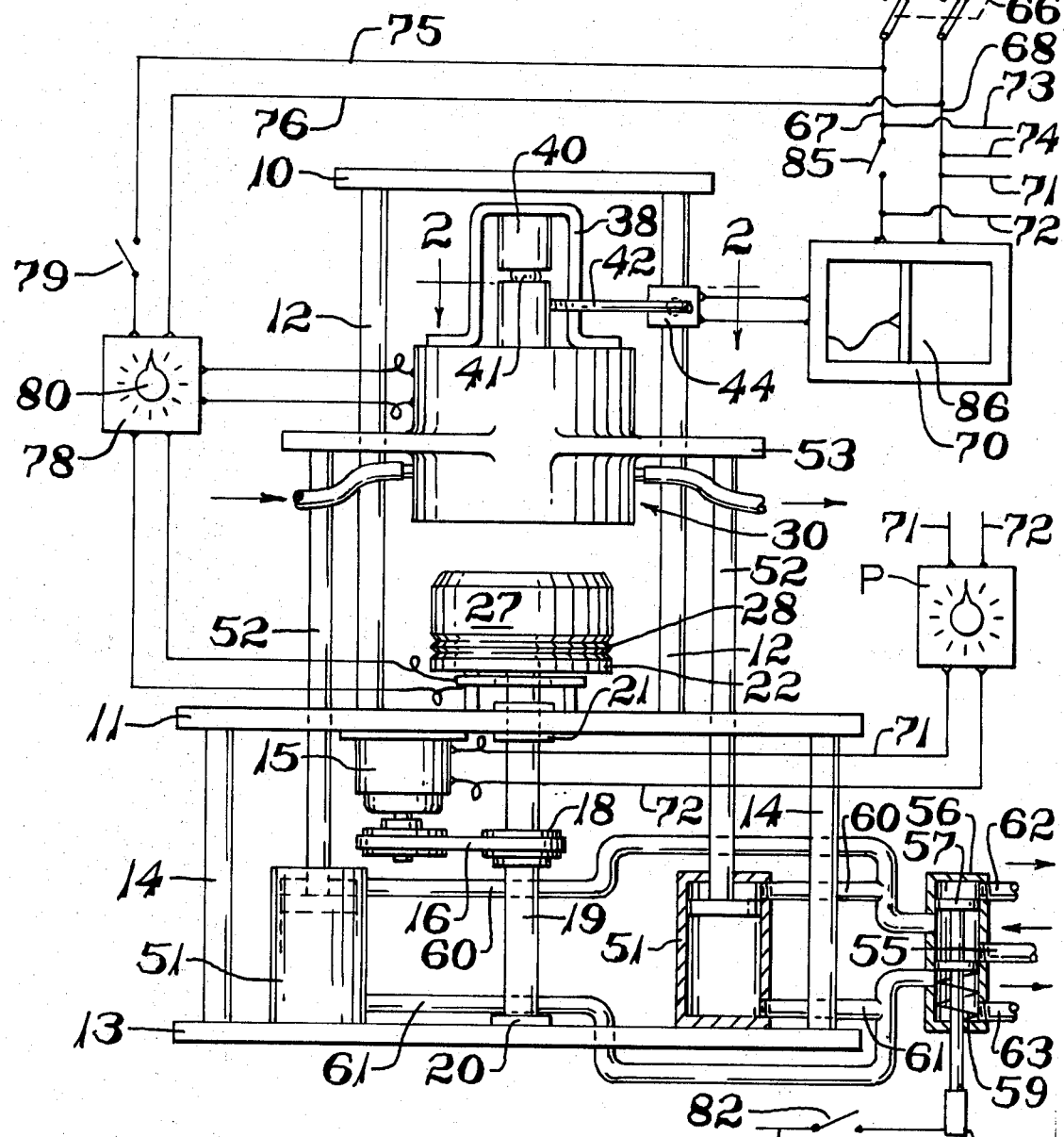
FIG. 1 is a diagrammatic front elevational view of a preferred embodiment of the invention.
Figure 2:
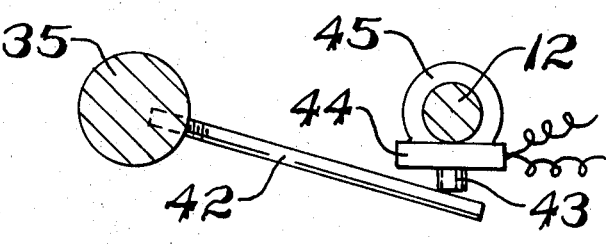
FIG. 2 is a cross-sectional view of the apparatus shown in FIG. 1 taken on lines 2—2 of FIG. 1.
Figure 3:
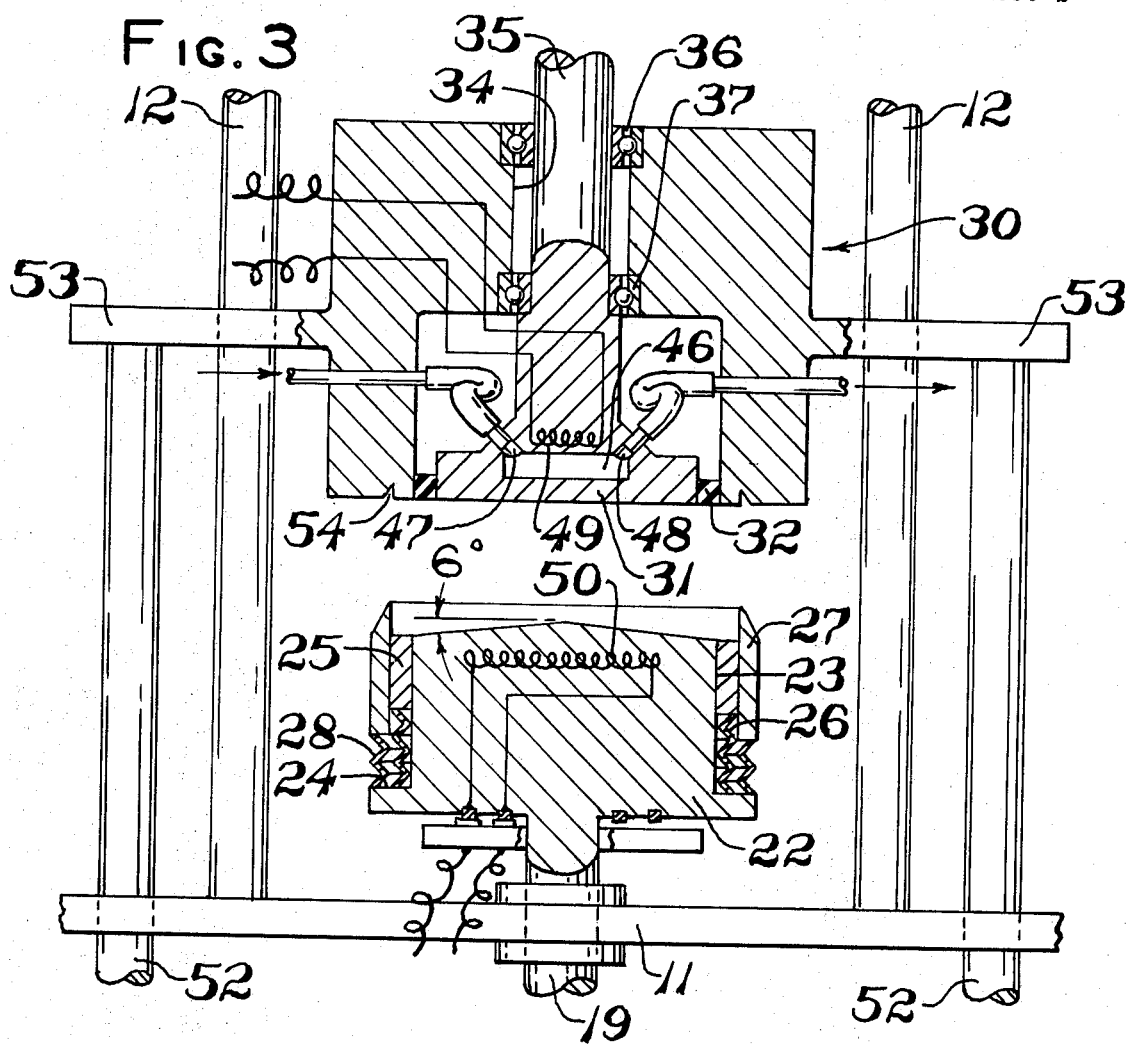
FIG. 3 is a front elevational view, partly in cross section, with the die members in open relationship.

Referring to the drawings wherein like reference numerals designate like or corresponding parts throughout the several views there is shown in FIG. 1 an upper frame member 10, an intermediate frame member 11 secured in spaced relationship by a plurality of rods 12, and a lower frame member 13 secured in spaced fixed relationship to intermediate frame 11 by a plurality of rods 14. Suitably mounted on intermediate frame member 11 is a drive motor 15 which has its output connected by a belt 16 to a drive pulley 18 which is suitably keyed to a drive shaft 19 journaled in bearings 20 and 21 which are in turn secured to lower frame member 13 and intermediate frame member 11. The upper end portion of drive shaft 19 is connected to a cylindrical plate or die member 22 whose upper face portion is conically shaped for a purpose to be described. The upper outer peripheral edge portion of the plate member or die member 22 is grooved or recessed as at 23 to provide a shoulder 24 to accommodate an annular ring 25 whose upper surface portion is flush with the adjacent upper surface portion of the die member 22. Located in the annular recesses of the plate or die member 22 between the annular ring 25 and the shoulder 24 are a plurality of annular springs 26 which exert an upward pressure thereon upon movement of the annular ring downwardly in a manner to be described. Die or plate member 22 has an annular guard ring 27 which encompasses the annular ring 25 and the die member 22. Such guard ring 27 is biased upwardly by a plurality of compression springs 28 which are suitably secured to die or plate member 22. As an example of the conical shape on die member 22, FIG. 3 discloses the included angle between the diverging faces of die member 22 as approximately 168° or as a 6° angle between a horizontal line and the slope of one of the diverging faces of the upper working surface of the die member 22. With this slope on the die member 22, each increment along the working surface of the die member 22, has the same shear rate as will be described.

Slidably mounted on the upper rods 12 is a carrier member 30 which houses centrally thereon an upper plate member or die member 31 whose lower surface portion is flat or horizontally disposed. The lower portion of the die or plate member 31 is bonded to the carrier member 30 by an annular rubber ring 32 which permits limited relative movement therebetween. An alternative method used to connect upper plate or die member 31 and carrier member 30 is a circular or square cross-sectioned O-ring that is compression fitted into a machined pair of grooves in the respective members 30 and 31 (inner groove in member 31 and an outer groove in member 30). Carrier member 30 may be segmented to facilitate the assembly thereof. Through the friction afforded between the O-ring and die member 31 and carrier member 30 a positive sealing action is obtained. Carrier member 30 has an annular central bore 34 to accommodate the upwardly extending cylindrical portion 35 of the die member 31. Die member 31 is suitably journaled in the carrier member 30 by bearing means indicated generally as 36 and 37. U-shaped bracket 38 is secured to the upper portion of carrier member 30. Mounted on the upper portion of bracket 38 is a torque sensing device or sensing means 40 which is connected via bearing means 41 to the upwardly extending cylindrical portion 35 of die member 31. Sensing means 40 is operative to measure the normal thrust which is exerted upon the die member 31. Mounted on the cylindrical portion 35 of die member 31 is laterally extending torque arm 42 which is adapted to abuttingly engage an arm 43 of a torque cell 44, which torque cell is suitably mounted on one of the guide rods 12 as by a bracket 45. The lower portion of die member 31 has a cooling chamber 46 connected via bores 47 and 48 to suitable conduits which provide cooling fluid for the chamber 46 to maintain a predetermined temperature thereon. Upper and lower die members 20 and 31 have heaters 49 and 50 suitably embedded therein to warm up such die members to a predetermined temperature and maintain such temperature of the die members in cooperation with the cooling chamber 46. Thermocouples may be embedded in the respective die members 20 and 31 to sense the temperature of such die members to aid in the temperature control thereof in a manner old and well known in the art. Suitably secured to the lower plate member 13 are a pair of spaced pneumatic cylinders 51 which have their piston rods 52 extending through suitable bores in the intermediate plate member 11 for connection to a laterally extending flange 53 of carrier member 30 whereby pressurization of the rod end of pneumatic cylinder 51 operates to move the carrier member 30 downwardly whereby upper die member 31 is positioned closely adjacent lower die member 22 such that the upper end portion of the annular guard ring 27 registers with an annular groove 54 (FIG. 3) in the lower portion of carrier member 30 to define a test chamber.

Fluid for moving the piston within cylinders 51 is supplied from a source under pressure not shown through a supply line 55 to a four-way, spring return solenoid valve 56, having a piston 57 moved either way by the action of solenoid 58 or return spring 59. Fluid is either supplied to or exhausted from cylinders 51 by means of lines 60 and 61. Fluid exhausted from the cylinder 51 passes through solenoid valve 56 to fluid exhaust lines 62 or 63.

Electrical power for controlled operation is supplied by electric lines 64 and 65 which are connected to a source of electrical power not shown. A double pull single throw switch 66 connects line 64 and 65 to main control lines or bus bars 67 and 68 which lead to a torque recorder 70. A similar control means and recorder is provided for the output of torque cell 40. Lines 71 and 72 connect motor 15 to lines 67 and 68, respectively. Lines 73 and 74 supply power to the solenoid 58, while lines 75 and 76 supply power to a temperature control unit 78 which in turn is connected to heating coils 49 and 50 embedded in the upper and lower die members 31 and 22, respectively. Insulated thermocouples are embedded in the die member 31 to sense the temperature of material being worked and confined which in turn may be connected to the temperature recorder not shown.

OPERATION

In the operation of the apparatus above, the operator preheats the die members 31 and 22 by closing the main control switch 66 and switch 79 located in line 75 and setting control knobs 80 on the temperature control unit 78 for the desired temperature. The operator then places a sample of material on a conical working surface of die member 22. The two die members 31 and 22 are then brought together by opening of switch 82 which deenergizes solenoid 58 such that spring 59 returns to piston 57 to move to its position, as shown in full lines in FIG. 1 which directs pressurized fluid via supply line 55 and lines 60 to the upper end portion of cylinder 51 which moves carrier member 30 along with die member 31 downwardly towards die member 22. Die member 31 in cooperation with die member 22 defines the test chamber in cooperation with the movement of annular guard ring 27 projecting into the annular recess 54. Upon confining of the test sample within the test chamber the operator then closes switch 85 to energize motor 15 to thereby cause die member 22 to rotate continuously. A shearing stress is effected on the confined material, which stress is a uniform shearing stress since the distance between the working surface of die member 22 and the plate member 31 increases as one goes further away from the apex of die member 22 and the angular velocity of the die member 22 increases as one goes further from the apex thereby maintaining a uniform shear rate through the entire working surface of the material being tested. As die member 22 rotates, the shearing forces over the surface of the conical working surface are transmitted through die member 31 to torque sensing device or sensing means 40 and thereby recorded as torque units by the torque recorder 70 as a graph of a moving chart 86. The speed of rotation of drive motor 15 is progressively increased manually as by a potentiometer P or by an automatic sequencing device at fixed time intervals by a variable speed drive unit such as the series 75 adjustable speed drive system manufactured by Cleveland Machine Controls Inc., which is located on Brookpark Road, Cleveland, Ohio, to thereby increase the shear rate to determine the viscosities at different shear rate such as depicted by FIGS. 7 and 8.

With the sealed chamber as defined by the above-described structure, the test material is fully confined and prevented from extruding out at the periphery of the chamber. This extrusion tendency of the test material is due to the elastic nature of elastomers and is characteristic of all rubbers. The tendency to extrude is enhanced at high shear rates due to the thermal expansion from viscously generated heat, which as described above is resolved by the ability of the expansion ring 25 to move downwardly as viewed in FIG. 3 to make room for the expansion without affecting the shear rate since the expansion ring lies at a greater radial distance from the apex of the cone of the lower die member 22 than the outer edge of die member 31.

Thus the stress sensitive inner plate or plate member 31, by being separated from the surrounding carrier member 30 by the easily deformed resilient seal or ring 32 permits the plate member 31 to register the shear stress accurately. The resilient seal or ring 32 serves mainly as an elastic, low force seal. In addition with the cooling chamber 46 lying closely adjacent to the test material the temperature of the material is maintained at a precise controlled temperature.

The chart below illustrates clearly the differences in viscosity behavior of rubber flow wherein the shear rate is at 50 sec.$^{-1}$. Such chart is a hycar and butyl rubber wherein hycar is a nitrile-butadiene copolymer rubber and butyl is a polyisobutylene-isoprene copolymer.

| Rubber: | Comparable Mooney No. at 100° C. | Shear-stress | Normal stress number |
|---|---|---|---|
| Hycar | 61 | 26 | 90 |
| Butyl | 60 | 6 | 27 |

The chart above discloses in the first column the results of a test on hycar and butyl rubber as performed on a Mooney Viscometer ML-10 at a shear rate of approximately 2 sec.$^{-1}$. The very low shear rate stress measured is substantially identical; however at 50 sec.$^{-1}$ the shear stress as measured under the test apparatus described provides a result that is quite different wherein the shear stress for hycar is over 4 times as great as that for butyl rubber while the normal stress is 3⅓ as great for hycar as for butyl. The significance of these numbers is that it indicates to the processing engineer the nerve, toughness and difficulty that will be encountered in the processing of the finished product. In comparing hycar to butyl, from the data obtained hycar would be considered tough and nervy and difficult to mix, extrude and calendar whereas butyl indicates to be much less nervy and tough, easier to mix and extrude. Nerve of rubber refers to the ability to return to its condition prior to deformation. After obtaining the initial data on the desired rubbers such as hycar, the processor through the use of such test apparatus can further refine the end product by adjusting the compounding or through adjusting the polymerization recipe to provide a product that can be more easily worked and still retain the valuable properties from a performance standpoint.

A further example of this is where the processing engineer can change the amount of carbon black in the mix since the carbon black reduces nerve in all rubbers and aids in processing. This modifies the behavior of the pure or gum rubber. With the use of such test apparatus the processing engineer can quickly and accurately predict the behavior qualities of the compound.

The appearance of the two test specimens upon removal from the test apparatus shows the hycar specimen as drastically changed from a flat cylindrical specimen to a conical specimen having equilateral side with an included angle of approximately 60° consistent with its higher normal stress number, whereas the butyl rubber specimen has very little change upon release from the test chamber and retains its flat cylindrical shape consistent with its lower normal stress number.

Figure 9:
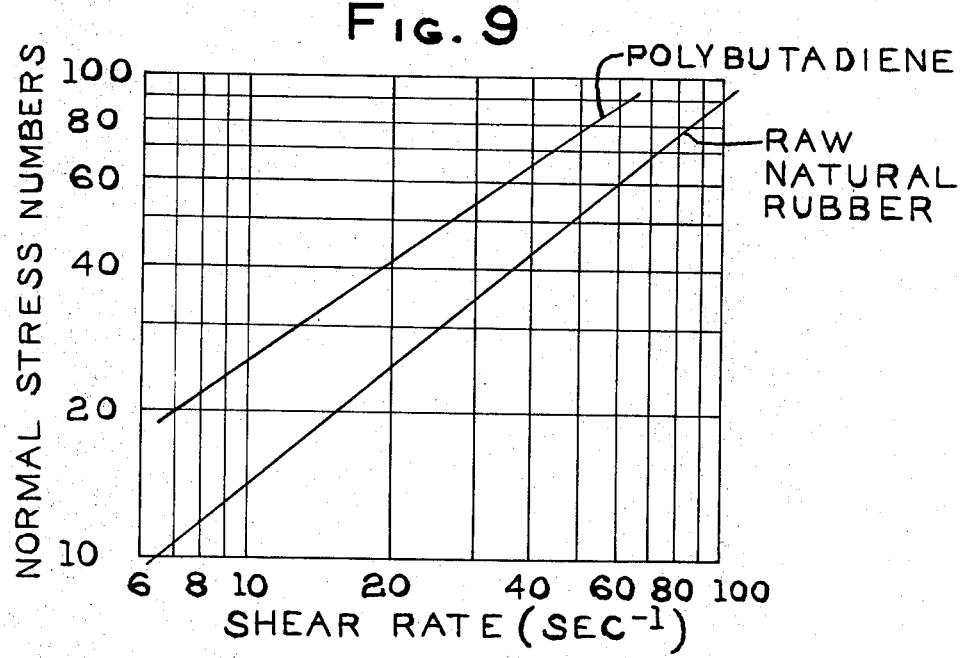
FIG. 9 is a chart disclosing the normal stress numbers of polybutadiene versus raw natural rubber under varying shear rates.
Figure 10:
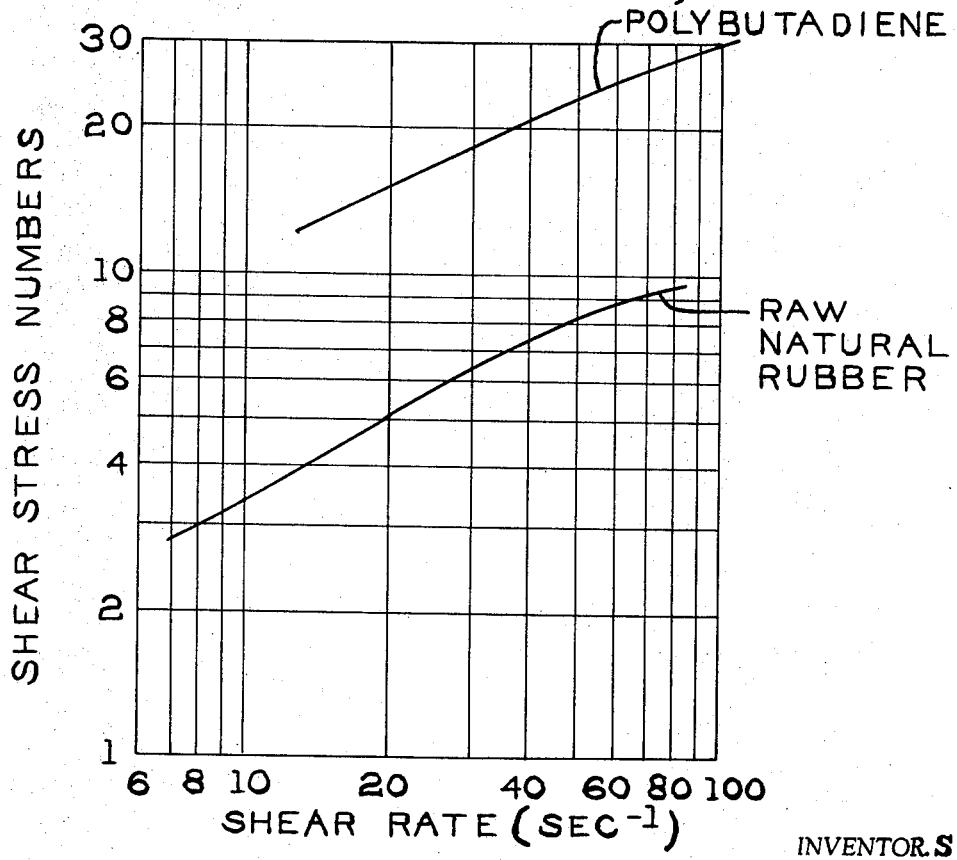
FIG. 10 is a chart disclosing the shear stress numbers of polybutadiene versus raw natural rubber under varying shear rates.

As a further example of the versatility of the test apparatus reference is made to FIGS. 9 and 10, where the abscissa axis via a log scale discloses the shear rate, wherein such shear rate is defined as the cone rotational speed in radians per second divided by the cone angle in radians (as determined by the cone and plate). The ordinate of FIG. 9 is the normal shear stress numbers in newtons per centimeter squared. Prior art apparatus as the Mooney Viscometer at a shear rate of approximately 2 sec.$^{-1}$ would give approximately the same normal shear stress numbers for polybutadiene and row natural rubber whereas at a shear rate of 10 sec.$^{-1}$ the normal shear stress number would be 25 versus 14 for raw natural rubber which is almost double. This considerable difference in properties is promptly and accurately available with the use of the described test instrument. Further at a shear rate of 30 sec.$^{-1}$ the shear stress number (FIG. 10) for polybutadiene would be 17, whereas the raw natural rubber would be 6.3 or approximately 3 times as great. FIG. 10 further discloses the great difference in shear numbers between materials at different shear rates. Thus, the processing engineer is able to ascertain rapidly and accurately those properties of shear stress at different shear rates to determine whether a compound is suitable for factory processing and whether changes in the recipe meet the desired specification.

Figure 4:
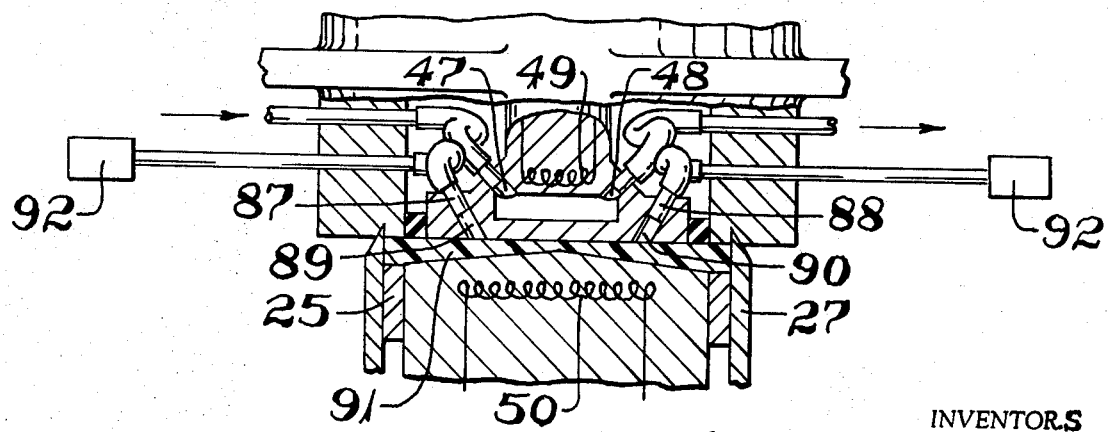
FIG. 4 is a front elevational view, partly in cross section, with the die members in closed working relationship.

A modification of the above-described apparatus is shown in FIG. 4 which is substantially the same structure as the original described embodiment, containing the same reference numerals except that means are provided to add various materials to the test chamber for mixing therein at controlled time intervals during the test cycle without interrupting the cycle. As seen in FIG. 4, a pair of spaced conduits 87 and 88 have one end communicating via bores 89 and 90 to the test chamber which contains a sample 91 while the other ends of conduits 87 and 88 are connected via flexible tubes to suitable injection rams of pumps 92—92 which operate to add fillers, pigments, oil or other materials to the mixing chamber. Although only two conduits are shown which provide means for adding fillers, pigments and oils, it is contemplated to have a plurality of such conduits to provide adequate means for controlled additions of such ingredients. Through the use of the conduits 87 and 88 the operator is able to study the dispersive mixing of fillers into rubber in a uniform shear field as the torque, normal force and temperature are monitored.

Figure 5:
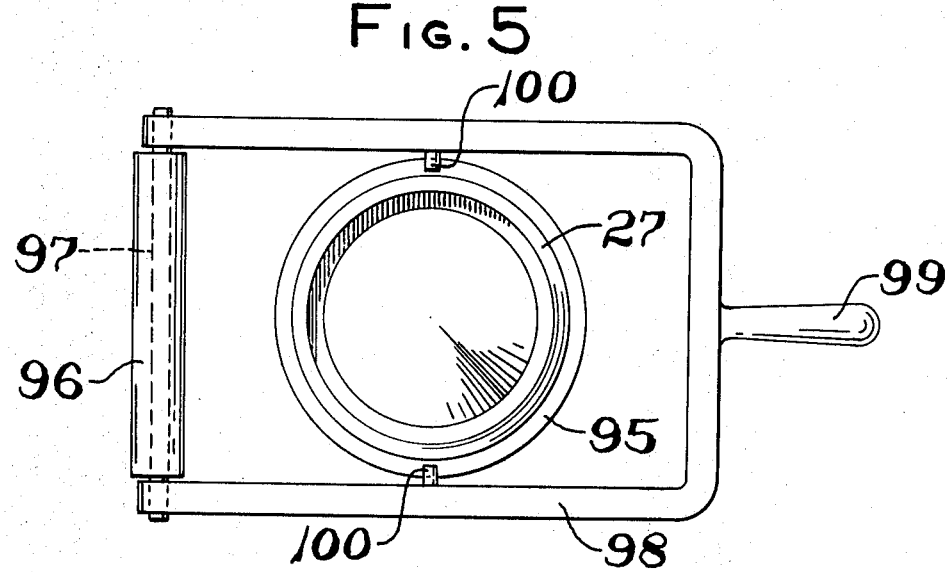
FIG. 5 is a plan view of a modified form of a portion of the apparatus showing the lower die member and lever means.
Figure 6:
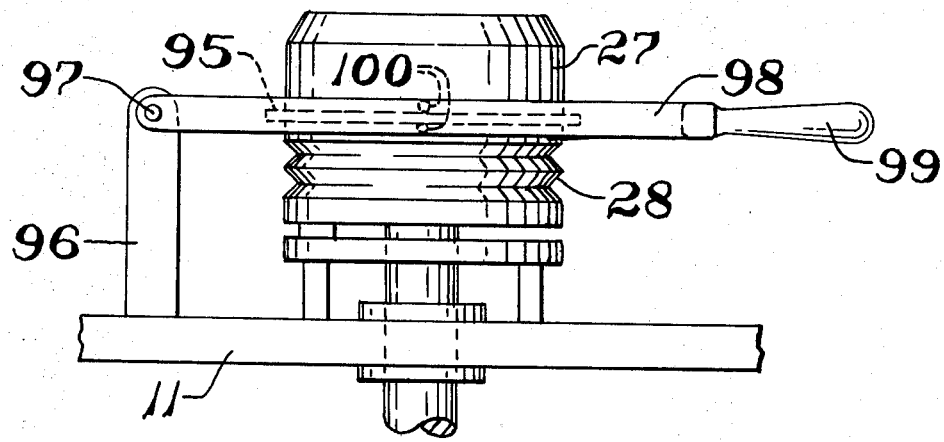
FIG. 6 is a side elevational view of a portion of the apparatus shown in FIG. 5 disclosing the lower die member and the lever means.

A further modification of the above-described apparatus is shown in FIGS. 5 and 6 which is substantially the same structure as the original described embodiment, containing the same reference numerals except that means are provided to maintain an annular guard ring 27 in a down position during the closing operation. Annular guard ring 27 has a circumferentially extending flange 95. Mounted on intermediate plate member 11 is a vertically extending bracket 96 having a horizontally extending bore extending therethrough at the uppermost end portion which bore has a horizontally disposed shaft 97. Journaled on the respective end portions of the shaft 97 is the respective outermost leg portions of a U- shaped bracket or lever means 98 which has a handle 99 suitably connected thereto. Each respective leg portion of bracket or lever means 98 has a pair of rollers 100—100 abuttingly captively engaging flange 95. By grasping handle 99, the operator can pivot the U-shaped bracket or lever means 98 downwardly about the shaft 97 such that the flange 95 which is captively held by spaced rollers 100—100 which force annular guard ring 27 downwardly against the action of compression springs 28. Release of the handle will allow springs 28 to move the guard ring 27 upwardly. The annular guard ring 27 is maintained in a down position by the mechanical lever means 98 during the closing operation to allow the test sample to fill the cavity completely, after which guard ring 27 is allowed to move up to thereby cut off the excess material from the overflow.

The invention provides the processing and research engineer with an additional tool to ascertain accurately and rapidly shear rate numbers and normal shear numbers under varying shear rates in a facile manner.

It will be understood that although this invention has been described with reference to a specific embodiment of the invention thereof, changes and modifications readily apparent to those skilled in the art may be made thereto within the spirit and scope of the invention as defined in the appended claims.

What is claimed is:

1. An apparatus for determining physical properties of elastomeric materials comprising a pair of spaced plate members, an annular member having its inner periphery resiliently bonded to the outer periphery of one of said plate members, said annular member and said one plate member having flat coplanar surfaces, said annular member having an annular groove in said flat surface, the other of said plate members having an outer annular ring encompassing the outer periphery thereof, means to move said one plate member toward and away from said other plate member to register said annular groove with said annular ring upon movement of said one plate member toward said other plate member to thereby define a test chamber between said plate members, said other plate member having a conical portion projecting into said test chamber with the apex of said conical portion registering with the center of said one plate member, variable speed drive means connected to said other plate member for imposing rotation thereof, control means connected to said drive means to selectively control the input speed to said other plate member, temperature control means operatively connected to said plate members for maintaining a predetermined temperature in said plate members, means connected to said one plate member for registering torsional resistance in a test specimen held in said test chamber and said input speed to said other plate member being progressively varied from a minimum speed to a maximum speed to provide a progressively increasing shear rate.

2. An apparatus for determining physical properties of elastomeric materials comprising a pair of spaced plate members, an annular member having its inner periphery resiliently bonded to the outer periphery of one of said plate members, said annular member and said one plate member having flat coplanar surfaces, said annular member having an annular groove in said flat surface, the other of said plate members having an outer annular ring encompassing the outer periphery thereof, means to move said one plate member toward and away from said other plate member to register said annular groove with said annular ring upon movement of said one plate member toward said other plate member to thereby define a test chamber between said plate members, said other plate member having a conical portion projecting into said test chamber with the apex of said conical portion registering with the center of said one plate member, variable speed drive means connected to said other plate member for imposing rotation thereto, control means connected to said drive means to selectively control the input speed to said other plate member, temperature control means operatively connected to said plate members for maintaining a predetermined temperature in said plate members, means connected to said one plate member for registering torsional resistance in a test specimen held in said test chamber, said control means is operative to progressively vary said input speed to said other plate member from a minimum speed to a maximum speed to provide a progressively increasing shear rate, said other plate member has a second annular ring located thereon, and means biasing said second annular ring upwardly into adjacent working relationship with said other plate member wherein said second annular ring is operative to provide volume expansion of a test specimen in said test chamber.

3. An apparatus as set forth in claim 2 wherein said outer annular ring of said other plate member has lever means connected thereto for moving said outer annular ring toward and away from said one plate member to facilitate the cutting off of a test sample to be confined by the chamber defined by said plate members and said outer annular ring.

4. An apparatus as set forth in claim 2 wherein said one plate member has a plurality of bores communicating with said test chamber for the introduction of materials therein, and pump means operatively connected to said bores for forcing materials into said chamber.

5. An apparatus as set forth in claim 2 wherein said second annular ring is located at greater distance from said apex of said conical portion than said inner periphery of said annular member.

6. An apparatus as set forth in claim 5 wherein sensing means are operatively connected to said one plate to measure normal thrust thereon.

7. An apparatus as set forth in claim 6 wherein the included angle defined by one face of the conical working surface of said other plate member and said horizontally extending surface of said one plate member is in the range of 0–15°.

8. An apparatus for determining physical properties of elastomeric material comprising a support frame, a die member rotatably mounted on said support frame, said die member having an upper conical-shaped projection operating as a working surface, said die member being recessed along its outer periphery, an annular spring biased ring located in said recess having its upper surface registering with the adjacent working surface of said conical-shaped projection, an annular guard ring encompassing said annular ring and said die member, said annular guard ring having an upper annular edge portion, means operatively connected to said annular guard ring biasing said guard ring to position said upper annular edge upwardly beyond the apex of said conical-shaped projection, means to rotate said die member at a programmed variable speed, a carrier member mounted on said support frame for movement toward and away from said die member, motive means mounted on said support frame and operatively connected to said carrier member for moving said carrier member toward and away from said die member, said carrier member having a central bore, a plate member journaled in said central bore, said plate member having an upwardly extending shaft portion extending through said central bore, an annular bonding ring resiliently connecting said plate member to said carrier member, said carrier member having an annular recess operative to register with said annular guard ring upon movement of said carrier member toward said die member, temperature control means for maintaining a predetermined temperature in said plate members, and torque sensing means mounted on said shaft portion for registering torsional resistance in a test specimen held between said die member and said plate member as confined by said guard ring.

9. An apparatus as set forth in claim 8 wherein said means to rotate said die member at a programmed speed is at an increasing rate of speed from a minimum to a maximum speed to provide shear stress numbers at increasing shear rates.

10. An apparatus as set forth in claim 9 wherein said annular guard ring has a flange, pivot means operatively connected to said flange for moving said flange and guard ring toward and away from said plate member.

11. An apparatus as set forth in claim 8 wherein said torque sensing means is cooperative with recorder means for registering the viscosity in relation to the increasing rotation or shear rate.

12. An apparatus for determining physical properties of elastomeric material as set forth in claim 8 wherein said spring biased annular ring is located at a greater radial distance from the apex of said die member than the annular bonding ring.

13. An apparatus for determining physical properties of an elastomeric material as set forth in claim 12 wherein said rotating means for said die member is operative to rotate said die member from a speed of .02 revolution per minute to 500 revolutions per minute pregressively.

14. An apparatus for determining physical properties of an elastomeric material as set forth in claim 13 wherein the included angle defined by one face of the diverging conical working surface of said die member and said horizontally extending working surface of said plate member is in the range of 0–15°.

References Cited

UNITED STATES PATENTS

| | | | |
|---|---|---|---|
| 2,037,529 | 4/1936 | Mooney | 73—54 XR |
| 2,752,778 | 7/1956 | Roberts et al. | 73—60 |
| 3,182,494 | 5/1965 | Beatty et al. | 73—59 XR |
| 3,387,490 | 6/1968 | Wise | 73—60 XR |

OTHER REFERENCES

Journal of Scientific Instruments, vol. 27, August, 1950, "A Continuous-Shear Rheometer for Measuring Total Stress in Rubber-like Materials," by W. F. O. Pollett, pp. 209–212.

Analytical Chemistry, vol. 28, November 1956, pp. 1710–1714, "Cone-Plate Viscometer," by R. McKennel.

LOUIS R. PRINCE, Primary Examiner

H. C. POST, III, Assistant Examiner

U.S. Cl. X.R.

73—59, 101

Attorney's File No. 16911

PO-1050
(5/69)

UNITED STATES PATENT OFFICE
CERTIFICATE OF CORRECTION

Patent No. 3,535,914      Dated October 27, 1970

Inventor(s) Alan G. Veith and Alfonso W. Mehrbrodt

It is certified that error appears in the above-identified patent and that said Letters Patent are hereby corrected as shown below:

Column 1, line 27, delete "provided" and insert ---provides---.
Column 7, line 46, delete "thereof" and insert ---thereto---.
Column 9, line 22, delete "pregressively" and insert ---progressively---.

SIGNED AND
SEALED
JAN 12 1971

(SEAL)
Attest:

Edward M. Fletcher, Jr.
Attesting Officer

WILLIAM E. SCHUYLER, JR.
Commissioner of Patents